United States Patent
Herold et al.

(10) Patent No.: US 8,708,115 B2
(45) Date of Patent: Apr. 29, 2014

(54) DEVICE FOR DAMPING VIBRATIONS

(75) Inventors: Sven Herold, Gross-Umstadt (DE); Dirk Mayer, Darmstadt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 883 days.

(21) Appl. No.: 12/593,333

(22) PCT Filed: Apr. 25, 2008

(86) PCT No.: PCT/DE2008/000710
§ 371 (c)(1),
(2), (4) Date: Sep. 28, 2009

(87) PCT Pub. No.: WO2008/131740
PCT Pub. Date: Nov. 6, 2008

(65) Prior Publication Data
US 2010/0101906 A1    Apr. 29, 2010

(30) Foreign Application Priority Data
Apr. 27, 2007    (DE) .................. 10 2007 020 050

(51) Int. Cl.
F16F 15/03    (2006.01)
(52) U.S. Cl.
USPC .......................................... 188/380; 267/136
(58) Field of Classification Search
USPC ......... 188/378–380; 267/136, 140.14, 140.15
See application file for complete search history.

(56) References Cited

U.S. PATENT DOCUMENTS

| | | | | |
|---|---|---|---|---|
| 1,819,665 A * | 8/1931 | Wiltse | ............. | 188/380 |
| 2,796,149 A * | 6/1957 | Wallin | ............. | 188/380 |
| 5,456,341 A * | 10/1995 | Garnjost et al. | ............. | 188/378 |
| 5,570,286 A * | 10/1996 | Margolis et al. | ............. | 701/36 |
| 5,954,169 A * | 9/1999 | Jensen | ............. | 188/378 |
| 6,279,704 B1 | 8/2001 | Manfredotti | | |
| 6,681,908 B2 * | 1/2004 | Davis | ............. | 188/380 |
| 6,920,951 B2 * | 7/2005 | Song et al. | ............. | 180/165 |
| 7,213,690 B2 * | 5/2007 | Tanner | ............. | 188/287 |
| 7,250,697 B2 * | 7/2007 | Beaulieu | ............. | 310/12.12 |
| 2004/0226788 A1 | 11/2004 | Tanner | | |
| 2007/0241489 A1* | 10/2007 | Mizushima et al. | ..... | 267/140.14 |
| 2012/0222929 A1* | 9/2012 | Muragishi et al. | ............. | 188/379 |

FOREIGN PATENT DOCUMENTS

| | | |
|---|---|---|
| DE | 40 37 786 A1 | 11/1990 |
| DE | 41 21 746 C2 | 7/1991 |
| DE | 199 57 774 C1 | 12/1999 |
| DE | 10 2005 005 770 A1 | 8/2005 |
| DE | 103 51 243 B4 | 8/2005 |

(Continued)

*Primary Examiner* — Bradley King
(74) *Attorney, Agent, or Firm* — Antonelli, Terry, Stout & Kraus, LLP.

(57) ABSTRACT

A device is described for vibration damping, which is attachable on a mechanical structure or integratable therein, having at least one mass which is indirectly or directly operationally linked to the structure via elastic means, referred to as the so-called damper mass, and at least one actuator for changing a stiffness which can be associated with the elastic means. The invention provides an electrical power source, which is capable of generating electrical power exclusively using an oscillating relative movement resulting along the operational link between the damper mass and the structure, and a regulating unit, which is connected to the electrical power source, which activates the at least one actuator as a function of the vibration behavior of the structure based upon a vibration damping rule.

13 Claims, 2 Drawing Sheets

(56) References Cited

FOREIGN PATENT DOCUMENTS

| EP | 1 392 987 B1 | 8/2005 |
| FR | 2 784 350 A1 | 4/2000 |
| JP | 62-251542 | 2/1987 |

* cited by examiner

DEVICE FOR DAMPING VIBRATIONS

BACKGROUND OF THE INVENTION

1. Field of the Invention

The invention relates to a device for damping vibrations, which is attachable to a mechanical structure or integratable therein, having at least one mass, which is indirectly or directly operationally linked to the structure via elastic means, and at least one actuator for changing a stiffness which can be associated with the elastic means.

2. Description of the Prior Art

Devices for damping vibrations are used for the deliberate damping of specific vibration states of a mechanical structure, in that the vibration energy of the mechanical structure, which is set into vibrations, is intentionally withdrawn. Mechanical damper systems are disclosed in an array of publications, including DE 40 37 786, DE 41 21 746 C2, and DE 199 57 774 C1, to name only a few, which all have a damper mass, which is elastically coupled to the mechanical structure via a spring configuration, typically comprising a elastomeric material, and which withdraws vibration energy from the mechanical structure in the case of an excessive resonant vibration increase.

An adaptation of the damper properties is typically performed via a change of the elasticity and/or stiffness of the spring configuration. An adaptation of this type is typically performed in the preliminary stages of the implementation by the design construction of the electromechanical damper system.

A fundamental problem which damper systems are subject to relates to the frequency-specific design in regard to a targeted natural frequency, which is to be damped, of the mechanical structure, on which the damper system is to be used. That is, the damper system is designed so that the damping point and the natural frequency of the mechanical structure coincide. Typically, damper systems known per se are only for one damping point and/or are defined via the damping and/or are designed for a very narrow damping band. If the mechanical properties of the mechanical structure to be damped change, that is, if damping point and natural frequency of the structure to be damped no longer coincide, the damping system loses its effect. In especially critical cases, it is even conceivable that a frequency discord between damping point and natural frequency of the mechanical structure to be damped will have the result that the mechanical structure vibrates at a changed natural resonance and does so at vibration amplitudes which are significantly greater than an undamped mechanical structure. Accordingly, the desire exists for retuning the damper properties as needed, ideally automatically. Approaches of this type are found in the design of so-called active and/or adaptive damper systems, in which the current vibration state of a mechanical structure to be damped is detected by sensors and at least one actuator provided on a mechanical structure is set into counter vibrations as a function of the currently detected vibration state or the vibration and/or damping behavior of the damper is influenced by the actuator, whereby the interfering vibration state of the mechanical structure may be counteracted.

Thus, an adaptive vibration damper is disclosed in DE 103 51 243 B4, which essentially comprises an elongate leaf spring, one end of which is connected to a structure whose vibrations are to be damped and the other end of which is connected to a damper mass. In the simplest case, both leaf spring ends are additionally connected to a cable pull, which may be set shortened or lengthened by a linear actuator, whereby the bending stiffness of the leaf string is controllable. As a function of the vibration behavior of the structure, the damper point may be set by corresponding actuator activation and lengthening of the cable pull which may thus be initiated.

A frequency-variable damper, preferably for the deliberate vibration damping of aircraft components, is known from DE 10 2005 005 770 A1. In this case, the frequency-variable damper has an elastomer, essentially implemented as a hollow cylinder, which is made gas-tight on both sides by the vibrating structure, on one side, and by the damper mass, on the other side. To vary the elastic properties of the elastomer, the internal pressure of the cavity enclosed by the elastomer is varied correspondingly via a line system. Corresponding pumping devices and valve units are necessarily required for this purpose, in order to supply the volume enclosed gas-tight by the elastomer with variable pressure.

The active and/or adaptive damper systems known up to this point share the feature, in spite of their different embodiments, that an external power supply, whether in the form of electrical, hydraulic, or pneumatic energy, is necessary for the actuator-supported setting of the damper point, so that their field of use is restricted to structures whose vibrations are to be damped and components which allow a corresponding power supply.

SUMMARY OF THE INVENTION

The invention is a device for vibration damping, which is attachable to a mechanical structure or integratable therein, having at least one mass, which is operationally linked indirectly or directly to the structure via elastic means, which is the so-called damper mass, and at least one actuator for changing a stiffness which can be associated with the elastic means in such a way that no external power supply is necessary for the deliberate change of the stiffness of the elastic means for the purposes of optimized vibration damping on the structure whose vibrations are to be damped. In particular, it is possible to make the structural form of a vibration damper compact and also robust, so that the field of use of vibration dampers of this type may also be extended into areas and components which are inaccessible for a power supply of any type, such as rotating components, to be cited as representative of many other areas of use. A vibration damper implemented according to the invention concurrently also has at least identical or improved damper properties in comparison to the known vibration damper systems.

A device according to the invention for vibration damping comprises an electrical power source, which is capable of generating electrical energy exclusively using an oscillating relative movement resulting between the damper mass and the structure, and a regulating unit, which is connected to the electrical power source, which activates the least one actuator as a function of the vibration behavior of the structure and on the basis of a vibration damping rule.

The vibration damper system according to the invention is based on at least the electrical or electronic components necessary for the adaptive tuning of the damper frequency being supplied with sufficient electrical power, which is generated autonomously solely by power conversion of the relative vibration movement between damper mass and mechanical structure at the location of the vibration damping. Therefore, all power supply lines to the damper system are dispensed with, so that it is attachable to inaccessible locations and components. The novel damper system thus represents an autonomously operating isolated solution.

Especially preferred systems for obtaining electrical power from vibrations, that is, solely from movement energy, are based either on the electromechanical transducer principle, for example, based on the piezoelectric or magnetostrictive effect, or on the electrodynamic principle, in which an electrical conductor, preferably a coil configuration, is moved inside a magnetic field, whereby an electrical current flow is initiated in the conductor as a result of the Lorenz forces engaging on the charge carriers contained within the conductor.

In a preferred embodiment, the autonomously operating, adaptively acting vibration damping system according to the invention has at least one vibration sensor, which detects the current vibration state and/or the vibration behavior of the structure and generates sensor signals, which are supplied to the regulating unit for further analysis. The regulating unit itself generates activation signals for the least one actuator on the basis of a vibration damping rule, which is capable of deliberately influencing the elasticity and/or the stiffness of the elastic means, whereby the vibration damping frequency is exactly tunable to the current vibration behavior of the structure, in order to finally damp it in an optimized way. The sensor unit, the regulating unit, and also the actuator require an electrical power supply for their functions, which is provided in the way proposed on location by the electrical power source described above. If more electrical power is to be temporarily available than the corresponding electrical and/ or electronic components are capable of consuming, an additional power storage, for example, in the form of a storage cell or a capacitive configuration, may preferably be provided. It is also possible to provide further electrical consumers, which may be powered correspondingly in the event of an excess of electrical power, for example, a wireless information exchange unit, via which different vibration damping rules may be transmitted wirelessly, or a settable electrical resistor.

In addition, the vibration damping is performed in two ways, namely on the one hand in the course of the active influencing of the mechanical damper system on the current vibration behavior of the structure whose vibrations are to be damped, on the other hand, the electrical power source itself also contributes to additionally damping the structural vibrations, through a continuous energy dissipation in the course of the energy conversion from vibration energy into electrical power. Through deliberate energy dissipation in the course of the above energy conversion, the damping of the damper and/or the mechanical structure may be influenced.

The autonomously operating vibration damping system is advantageously distinguished in particular in that all wiring may be dispensed with which was necessary in damper systems known up to this point for an external power supply. Furthermore, this results in the advantage that adaptively operating damper systems may also be used at locations and on components which were inaccessible for typical damper systems. Above all, these are rotating components in production and tool facilities, offshore constructions, which are to be implemented as autonomously operating systems in any case, large structures, such as bridges, in particular in areas which were difficult to access or inaccessible, and also areas of automobile technology, in which a power supply requires disproportionately complex and ultimately costly wiring.

BRIEF DESCRIPTION OF THE DRAWINGS

The invention is described for exemplary purposes hereafter without restriction of the general idea of the invention on the basis of exemplary embodiments with reference to the drawings. In the figures.

DETAILED DESCRIPTION OF THE PREFERRED EMBODIMENTS

Figure 1:
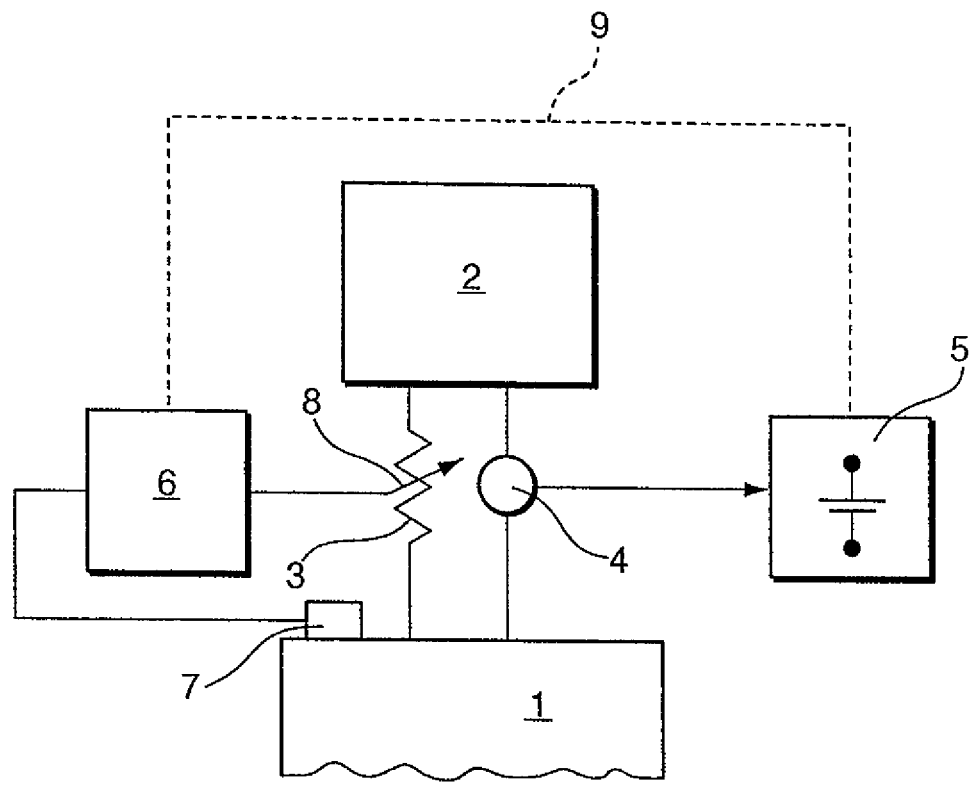
FIG. 1 shows a replacement circuit diagram for an autonomous-power adaptive vibration damper.

FIG. 1 shows a schematic replacement circuit diagram for an autonomous-power adaptive vibration damper, which is to damp a vibrating structure 1 as effectively as possible. The vibration damper has a damper mass 2 for this purpose, which is connected via elastic means 3, for example, in the form of a spring element and/or spring system, to the structure 1. The elastic means 3 have an elasticity and/or stiffness which are variably settable. The further exemplary embodiments will show how specifically a variable elasticity setting of the elastic means of this type may be implemented. In addition, achievements which are known per se from the prior art may be used. Moreover, an electrical power source 4 is provided, which is capable of converting the relative vibration movement of the damper mass 2 relative to the vibrating structure 1 into electrical power. In the replacement circuit diagram in FIG. 1, this is illustrated in that the electrical power source 4 is operationally linked between the structure 1 and the damper mass 2, preferably attached along the elastic means 3, as may also be inferred from the specific exemplary embodiments described hereafter. The electrical power generated with the aid of the electrical power source 4 is stored and/or buffered in the illustrated replacement circuit diagram in a power accumulator 5 and finally relayed for the electrical power supply via a supply line 9 to the following electrical components: thus, a regulating unit 6 is provided, in which sensor signals of a vibration sensor 7, which detects the vibration state of the structure 1 and is connected directly thereto for this purpose, are analyzed on the basis of a vibration damping rule and/or a vibration damping algorithm for the most optimized possible vibration damping, finally activation signals are generated for an actuator 8, which are capable of deliberately influencing the elasticity and/or stiffness of the elastic means 3.

The vibration damper according to the achievement of the object, which is schematically shown in FIG. 1, corresponds to a purely mechanically operating damper system, whose goal is to have the damper mass 2, which is coupled freely-vibrating via the elastic means 3 to the mechanical structure 1, oscillate at a vibration frequency, whereby as much vibration energy as possible may be withdrawn from the vibrating structure 1. To set the optimal damper frequency for this purpose, an active regulation of the elasticity and/or stiffness of the elastic means 3 in the course of a control circuit is needed, which is composed of the vibration sensor 7, the regulating unit 6, and the actuator 8. The electrical components contained in the control circuit require the electrical power supply which is schematically shown via the electrical supply line 9, however. The electrical power needed for this purpose is autonomously obtained as explained above, that is, without supply of external power within the damper system implemented according to the invention.

Figure 2:
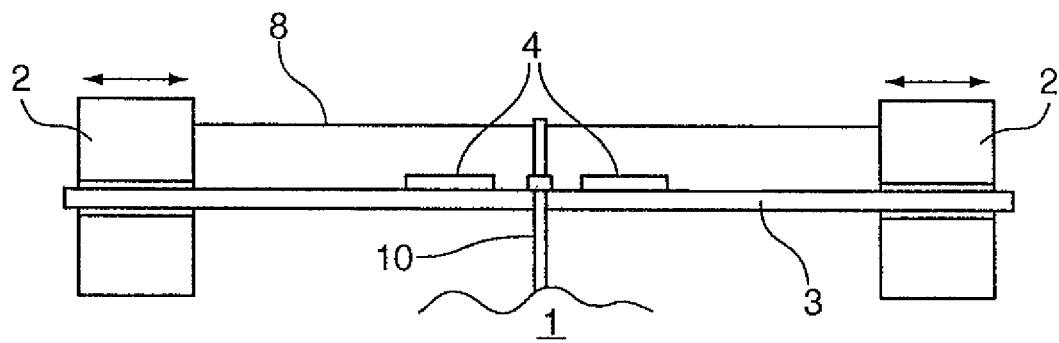
FIG. 2 shows a preferred exemplary embodiment for implementing an adaptively operating vibration damper.

FIG. 2 shows a specific exemplary embodiment of a damper implemented according to the invention. The illustrated components in FIG. 2 only showing the structure 1, whose vibrations are to be damped, the damper mass 2, the elastic means 3, the actuator 8, and the electrical power source 4.

It is thus assumed that elastic means 3, which are implemented as an oblong and/or rod-shape, are attached along a member 10 shaped as a rod, in such a way that the elastic means 3 are fastened torque-free on the member 10. It may thus be assumed, for example, that the elastic means 3 are implemented as a bar-like leaf spring 3. Longitudinally-movable damper masses 2 are provided on the bar spring on both sides and symmetrically to the contact point on the member 10 of the bar spring 3. Both damper masses 2 are additionally connected to an actuator 8, which is capable of moving each of the damper masses 2 along the spring bar 3 symmetrically to the member 10. It is obvious that the vibration behavior of the leaf spring 3 may be set variably by corresponding displacement of the damper masses 2 relative to the leaf spring 3. The actuator 8 is to be implemented in such a way that it is capable of transmitting both traction and also thrust forces, in the longitudinal direction to the spring bar 2, between the two longitudinally-displaceably mounted damper masses 2. For example, an SMA wire having a restoring spring may be used for this purpose.

The electrical power source 4 is implemented in the exemplary embodiment according to FIG. 2 in the form of piezoelectric elements, which are attached on the surface of the deflected spring bar 3. By deformation of the piezoelectric elements 4, a displacement of the charge carriers present in the interior of the piezoelectric elements occurs, whereby an electrical voltage is generated, which may be tapped in a suitable way.

Figure 3:
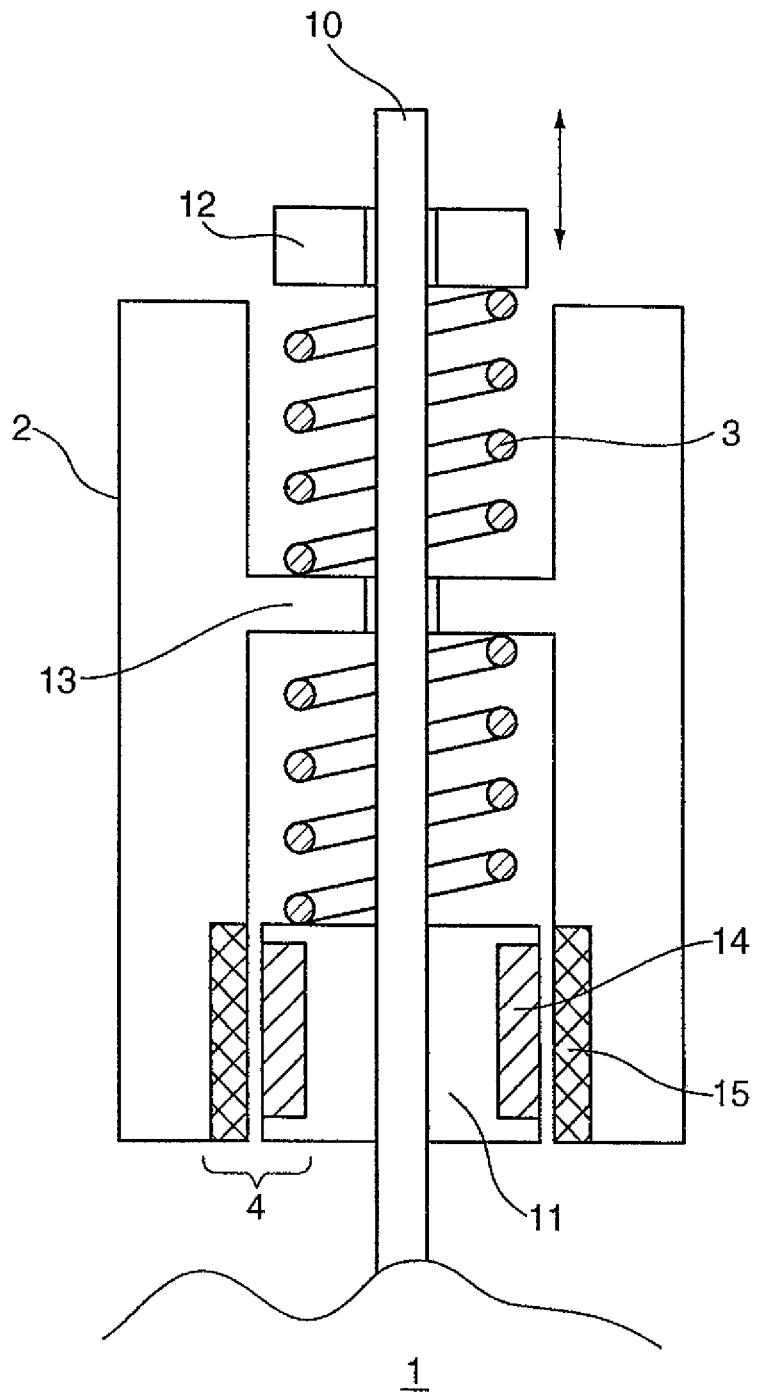
FIG. 3 shows a further alternative exemplary embodiment for an autonomous-power operating adaptive vibration damper.

A further embodiment is shown in FIG. 3. In this case, similarly to the present exemplary embodiment of FIG. 2, member 10 which is shaped as a rod, as illustrated, and which is connected on one side to the mechanical structure 1 whose vibrations are to be damped. A mechanical stop 11 is provided along the member 10, which is attached to the member 10. A spring element 3 presses on one side against the mechanical stop 11, while in contrast the other spring end adjoins an actuator hold-down 12, which is mounted so it is longitudinally movable relative to the member 10. Furthermore, a damper mass 2 is provided, which has a symmetrical shape enclosing the member 10, for example, is implemented in the form of a hollow cylinder, and is positively guided so it is linearly movable via an internally perforated intermediate web 13 along the member 10. The damper mass 2 is concurrently held vibrating by engaging in the spring element 3 in an axial position with spring force applied. Furthermore, in the exemplary embodiment according to FIG. 3, the electrical power source 4 is based on the electrodynamic action principle, that is, a coil system 14 is provided on the peripheral circumference edge of the mechanical stop 11, which is situated on the radial interior spaced apart from a magnet system 15, which generates a permanent magnetic field. The magnet system 7 is integrated in the damper mass 2 according to the illustration in FIG. 3.

Because of the vibrations exerted by the mechanical structure 1 on the damper system, the damper mass 2 experiences oscillating deflections axially relative to the member 10. The oscillating deflections and/or vibrations are finally determined by the stiffness and/or spring hardness of the spring element 3. In the course of the electrodynamic action principle, an electrical voltage may be tapped from the coil system 14, which is needed for the further power supply of all electrical components contained in the damper system. The actuator hold-down 12 is to be axially displaced relative to the member 10 for the adaptive damper frequency adaptation, whereby the spring element 3 is suitably compressed. The spring element 3 has a nonlinear stiffness, through which a settable variability of the damper frequency may be obtained.

LIST OF REFERENCE NUMERALS 1 mechanical structure
2 damper mass
3 elastic means, spring element
4 electrical power source
5 power accumulator
6 regulating unit
7 vibration sensor
8 actuator
9 power supply line
10 member
11 mechanical stop
12 actuator hold-down
13 intermediate web
14 coil system
15 magnet system

The invention claimed is:

1. A device for damping vibration in a structure, comprising:
at least one damper mass for absorbing vibrations originating in the structure operationally linked to the structure by an elastic damper and a member disposed between the elastic damper and the structure;
at least one actuator for changing stiffness of the elastic damper;
an electrical power source including a coil system and a magnet for generating a magnetic field for generating electrical power exclusively from oscillations between the elastic damper and the structure;
a regulating unit, connected to the electrical power source, for activating the least one actuator as a function of vibrations of the structure, based upon a vibration damping rule;
a mechanical stop positioned along the member, on which one end of the spring is supported and an opposite end of the spring is operationally linked to the at least one actuator which is longitudinally movable relative to the member; and wherein
the at least one damper mass is bidirectionally deflectable by the oscillations along an axis of the member;
the elastic damper comprises a spring controlled by the at least one actuator; and
the coil system is movable along the axis of the member in the magnetic field to generate the electrical power, the coil system is integrated into the mechanical stop, and the magnet is integrated into the at least one damper mass.

2. The device according to claim 1, comprising:
at least one vibration sensor for sensing the vibrations which is operationally linked to the structure and is connected to the regulating unit and to the electrical power source.

3. The device according to claim 1, wherein:
the electrical power source comprises at least one electrical conductor, which is movable relative to the magnetic field which is generated by a magnet, for inducing electrical current flow in the at least one electrical conductor.

4. The device according to claim 2, wherein:
the electrical power source comprises at least one electrical conductor, which is movable relative to the magnetic field which is generated by the magnet, for inducing electrical current flow in the at least one electrical conductor.

5. The device according to claim 1, comprising:
a power storage unit connected to the electrical power source for storing electrical power generated by the electrical power source.

6. The device according to claim 2, comprising:
a power storage unit connected to the electrical power source for storing electrical power generated by the electrical power source.

7. The device according to claim 3, comprising:
a power storage unit connected to the electrical power source for storing electrical power generated by the electrical power source.

8. The device according to claim 5, wherein:
the power storage unit comprises a capacitor and/or a storage cell.

9. A device according to claim 1 wherein
the spring has a nonlinear stiffness.

10. The device according to claim 1, wherein:
the electrical power source is operationally linked to the structure so that during conversion of vibration energy into electrical power the structure is subject to a vibration damping by the electrical power source.

11. The device according to claim 10, wherein:
the vibration damping is settable by geometric or electrical properties thereof.

12. The device according to claim 1, wherein:
the member comprises a rod.

13. A device for damping vibration in a structure, comprising:
at least one damper mass for absorbing vibrations originating in the structure operationally linked to the structure by an elastic damper and a member disposed between the elastic damper and the structure;

at least one actuator for changing stiffness of the elastic damper;

an electrical power source including a first part comprising coils and a second part comprising a magnet providing a magnetic field linked to the coils for generating electrical power exclusively from oscillations between the elastic damper and the structure;

a regulating unit, connected to the electrical power source, for activating the least one actuator as a function of vibrations of the structure, based upon a vibration damping rule;

a mechanical stop positioned along the member, on which one end of the spring is supported and an opposite end of the spring is operationally liked to the at least one actuator which is longitudinally movable to the member; and wherein the at least one damper mass is bidirectionally deflectable by the oscillations along an axis of the member;

the elastic damper comprises a spring controlled by the at least one actuator; and the electrical power source includes one of the first part and the second part integrated into the mechanical stop and another of the first part and the second part integrated into the at least one damper mass and one of the parts is movable along the axis of the member.

* * * * *